United States Patent
Park et al.

(10) Patent No.: US 6,680,915 B1
(45) Date of Patent: Jan. 20, 2004

(54) DISTRIBUTED COMPUTING SYSTEM USING VIRTUAL BUSES AND DATA COMMUNICATION METHOD FOR THE SAME

(75) Inventors: Kyu Ho Park, Taejon (KR); Jong Hyuk Choi, Seoul (KR); Bong Wan Kim, Cheju-si (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 0 days.

(21) Appl. No.: 09/313,859

(22) Filed: May 18, 1999

(30) Foreign Application Priority Data

Jun. 5, 1998 (KR) .............................................. 98-20844

(51) Int. Cl.[7] .......................... H04L 12/40; G06F 13/00; G06F 15/80

(52) U.S. Cl. ...................... 370/254; 370/390; 370/401; 370/405; 370/406; 370/409; 370/445; 709/238; 712/12

(58) Field of Search ................................ 370/254, 255, 370/257, 389, 390, 400, 401, 405, 409, 432, 445, 447, 406; 709/200, 238, 249; 712/10, 11, 12, 28

(56) References Cited

U.S. PATENT DOCUMENTS

| | | | | |
|---|---|---|---|---|
| 4,873,626 A | * | 10/1989 | Gifford | 364/200 |
| 4,933,936 A | | 6/1990 | Rasmussen et al. | 370/85.9 |
| 5,165,023 A | * | 11/1992 | Gifford | 395/325 |
| 5,710,935 A | * | 1/1998 | Barker et al. | 395/800 |
| 5,794,059 A | * | 8/1998 | Barker et al. | 395/800.1 |

* cited by examiner

*Primary Examiner*—Alpus H. Hsu
(74) *Attorney, Agent, or Firm*—Bachman & LaPointe, P.C.

(57) ABSTRACT

A router, which is basically a point-to-point communication router, is devised for the BUS-like communication between processors. Therefore, it is named as 'Virtual Bus'. One processor is connected to one router and the router can be connected in one dimensional array or two dimensional arrays. In case of two dimensional arrays, there are row and column router controllers. The method of communication consists of two phases: Firstly, the path between source processor and destination processor by sending set-up message. Secondly, messages are transferred without intervention of the intermediate routers between the source and destination processors. The idea is that the intermediate routers are set up to by-passing mode at the set-up phase. That is the routers in by-passing mode just relay the incoming messages to their output ports without any interruption. Therefore the virtual bus can guarantee high speed communication between processors. This method is equally applied to the two or more dimensional arrays.

10 Claims, 13 Drawing Sheets

Prior Art

Prior Art

DISTRIBUTED COMPUTING SYSTEM USING VIRTUAL BUSES AND DATA COMMUNICATION METHOD FOR THE SAME

BACKGROUND OF THE INVENTION

1. Field of the Invention

The present invention relates to a configuration for interconnecting a plurality of processors on multicomputer or a mesh computer capable of achieving its high speed via a parallel processing on operations by connecting the plurality of processors in a mesh architecture, and communication method for the same. In particular, the present invention relates to a distributed computing system using virtual buses adapted for urgent messages or broadcasting messages transmitting a message to different computers at the same time as well as a point-to-point communication and enabling high speed processing on a large amount of the parallel simulations, real-time programs, or the like by introducing virtual buses into the connection architectures among the processors, and data communication method for the same.

2. Description of the Prior Art

In general, the art of computer is tendentious to a miniaturization and high speed in virtue of semiconductor technologies, thereby providing multicomputer or mesh like and achieving high speed by interconnecting a plurality of processors to effect parallel processing.

The performance of the above-mentioned multicomputer greatly depends on the connection mode among the processors. The representative connection modes for configuring the multicomputer are a point-to-point link connection mode shown in the accompanying FIG. 1 and a bus connection mode shown in the accompanying FIG. 2.

First, the point-to-point link connection mode shown in the accompanying FIG. 1 is an example for one dimensional array form connected by point-to-point links. To be brief, each of a plurality of unit computer in a certain array can transmit different messages at the same time since the respective links can independently effect the communications. Accordingly, the point-to-point link connection mode has the advantage of high communication network throughput.

On the other hand, in case of processing broadcasting messages in the point-to-point link connection mode shown in the accompanying FIG. 1, the link connection mode has the problem in which the throughput of communication network is abruptly reduced because it occupies many links at the same time. Moreover, since the link connection mode must sequentially occupy the required links, it would take long time necessary for communications.

Unlike the above-mentioned point-to-point link connection mode, the bus connection mode can effectively transmit urgent messages or broadcasting messages. The bus connection mode shown in FIG. 2 is an example for one dimensional array connected by buses capable of multi-accessing.

To be brief, since urgent message or broadcasting message is directly connected to a destination node computer only once bus request without passing through router of the intermediate path, it would take short time even when transmitting broadcasting message.

On the other hand, in unicast communication among the neighboring unit computers, the bus connection mode must occupy all the buses in a certain array, only one message can be processed in that array at the same time, thereby degrading the communication throughput.

Consequently, because the prior arts of typical connection modes have both conflicting merits and demerits, recently, a method for configuring multicomputer taking only their merits have been proposed. The typical methods include the technologies disclosed in U.S. Pat. No. 4,933,936 and the References(Reference 1 to Reference 3) as set forth below:

Reference 1: Q. Stout, Mesh-connected Computers with Broadcasting, IEEE Trans. Computers, C-32(9):826–830, September 1983.

Reference 2: M. Serrano and B Parhami, Optimal Architecture and Algorithms for Mesh-connected Parallel Computers with Separable Row/Column Buses, IEEE Trans. Parallel and Distributed Systems, 4(10):1073–1079, October 1993.

Reference 3: J. Duato, F. Silla, and S. Yalamanchili, A High Performance Router Architecture for interconnection Networks, 1996 International Conference on Parallel Processing, pp I-61–68, 1996.

To be brief on the above U.S. Pat. No. 4,933.936 and the References, the U.S. Pat. No. 4,933.936 describes on separate two physical network configurations, in which the broadcasting message is transmitted through the bus network and other messages are transmitted through the communication link of other path according to the types of communications via separate two communication paths in distributed environments.

Also, the Reference 1 describes on the effect(the reduction of performance time) obtainable upon adding a network for broadcasting to mesh computer, the Reference 2 describes on a method for performing semigroup and prefix computations by only a minimum network resource without a loss due to the complexity of the time in the computer connected in mesh architecture having row and column bus.

Finally, the Reference 3 describes on the architecture of router for transmitting data by adopting a wave pipelining transmission technique and thus forming a circuit with link from source node to destination node in unicast communication.

Referring to the above U.S. Pat. No. 4,933,936 and the References, they have the architecture comprising separate two communication networks as shown in the accompanying FIGS. 3 and 4.

FIG. 3 illustrates one dimensional array, and FIG. 4 illustrates the architecture of two dimensional mesh communication network having physical row and column bus. Each of nodes(N) shown in FIG. 4 is comprised of four channels connected to 16-bit shared buses (CBa to CBd and RBa to RBd) and a 16-bit unidirectional link(L). In this case, the respective nodes must have a switch for a point-to-point link and a transceiver for driving bus lines, however, there is the problem in which the speed of bus is slower than that of the point-to-point link due to fan-out limitation of the bus transceiver.

Therefore, in the above U.S. Pat. No. 4,933,936 and the prior arts disclosed in the References, the broadcasting messages and unicast transmission messages have been processed through each of separate two communication networks connected to one unit computer. Accordingly, this method would be expected to effectively use the resource of communication network only when the traffic of communication network is evenly distributed to separate two communication network.

However, when the traffic of communication network is concentrated into one type of communication network, the entire communication networks are in saturation even if other types of communication network can afford to process messages. Namely, because the bandwidth allocation to two communication networks is predefined in the design phase of communication network regardless of the types of task to perform, the problem in which the resources of communication network are wasteful has been arisen in most of programs expect for some defined application programs having communication pattern adapted for the assigned bandwidth.

SUMMARY OF THE INVENTION

Therefore, in order to overcome the problems encountered with the prior art, the object of the present invention is to provide a distributed computing system using virtual buses adapted for urgent messages or broadcasting messages transmitting a message to different computers at the same time as well as a point-to-point communication and enabling high speed processing on a large amount of the parallel simulations, real-time programs, or the like by introducing virtual buses into the connection architectures among the processors, and data communication method for the same.

In accordance with the present invention, the object is accomplished by providing a distributed computing system of one dimensional architecture having a predetermined number of routers, the connection among the respective routers being made in a point-to-point link, the respective routers being connected to each processor, the respective routers comprising: means for forming a direct data transmission path between an input terminal and an output terminal corresponding to the array dimension of the routers in order for the respective routers to use the point-to-point link connected with router adjacent to the respective routers as one virtual bus on specific condition; and row and column control lines wire-ORed with the respective routers according to one dimensional architecture in which the respective routers are arrayed for exchanging information among the respective routers, the control line being driven when the means for forming a direct data transmission path is driven to form the virtual buses.

In accordance with the present invention, another object is accomplished by providing a distributed computing system having a predetermined number of routers, the connection among the respective routers being made in a point-to-point link, the respective routers being connected to each processors, the respective routers comprising: means for forming a direct data transmission path between input terminal and output terminal corresponding to the array dimensional of the routers in order for the respective routers to use the point-to-point link connected with router adjacent to the respective routers as one virtual bus on specific condition; row and column control lines wire-ORed with the respective routers according to architecture in which the respective routers are arrayed for exchanging information among the respective routers; and two or more dimensional architecture with the distributed computing system of one dimensional array driven by the control line being arrayed and formed in a hierarchical connection architecture such as multi-dimensional mesh, hypercube and hierarchical ring when the means for forming a direct data transmission path is driven to form the virtual buses.

In accordance with the present invention, further another object is accomplished by providing a method for preventing link data from colliding with bus data when using link as virtual bus, in a distributed computing system comprising a predetermined number of routers being arrayed in mesh architecture, the connection among each of the routers being made in a point-to-point link, the respective routers including a direct data transmission path between an input terminal and an output terminal in row axis and column axis directions in order for the respective routers to use the point-to-point link connected with router adjacent to the respective routers as one virtual bus on specific condition; and row and column control lines wire-ORed with the respective routers according to row and column in which the respective routers are arrayed for exchanging information among the respective routers when the direct data transmission path included between the input terminal and the output terminal is driven to form the virtual buses, the method comprising the steps: a first step for detecting a bus busy signal on the row control line and column control line and determining whether the operation of the virtual bus has been issued; if it is determined that the operation of the virtual bus has been issued in the first step, a second step for determining whether or not a significant data exists on the link; if it is determined that the data exists in the second step, a third step for transmitting a signal meaning that data on the present link must be ignored from transmission side of the link data to reception side; a fourth step for transmitting a signal indicating the reception completion of the link data to the transmission side if the reception side receives and preserves the present link data before the reception side receiving the signal transmitted from the transmission side in the third step, and for not preserving the present link data if the reception side receives the signal transmitted from the transmission side in the third step before the link data being preserving in the reception side; and a fifth step for deleting the data preserved in the transmission side if the transmission side receives the reception completion signal of the link data transmitted from reception side to transmission side, and for preserving the transmitted data if the transmission side does not receive the reception completion signal of the link data transmitted from reception side to transmission side.

In accordance with the present invention, still another object is accomplished by providing a data communication method using virtual buses including a function for preventing collision between link data and bus data when forming the virtual buses in a distributed computing system, in the distributed computing system comprising a predetermined number of routers being arrayed in mesh architecture, the connection among each of the routers being made in a point-to-point link, the respective routers including a direct data transmission path between an input terminal and an output terminal in row axis and column axis directions in order for the respective routers to use the point-to-point link connected with router adjacent to the respective routers as one virtual bus on specific condition; and row and column control lines wire-ORed with the respective routers according to row and column in which the respective routers are arrayed for exchanging information among the respective routers when the direct data transmission path included between the input terminal and the output terminal is driven to form the virtual buses, the method comprising the steps: a first step for allowing a source router of a router trying to transmit data to select one mode of unicast communication mode, multicast communication mode, column broadcasting communication mode or broadcasting communication mode as the transmission mode of transmission data according to the kind of data or the position of a reception router; a second step for allowing the source router to request the use of a row or a column virtual bus according to the data communication mode selected by the first step; a third step for transmitting the data communication mode selected by the first step via the row or the column control line and informing the routers of it in the virtual bus if the bus grant is taken by the second step at the source router; a fourth step for proceeding all the routers on the virtual bus taking the bus grant after the third step except for the. source router to a link data freezing process; a fifth step for allowing the source router to transmit information related to a destination router(s) and bridge(s) via the formed virtual bus to set the destination router(s) and bridge(s); a sixth step for allowing each bridge to perform operations similar to the second to fourth steps so as to form the virtual bus to the destination router(s) according to the information of the destination router(s) transmitted from the source router when the bridge is set through the fifth step; and a seventh step for transmitting data at the source router if the virtual bus is formed through the sixth step between the source router and the destination router(s).

BRIEF DESCRIPTION OF THE DRAWINGS

The above object and other objects and aspects of the invention will become apparent from the following description of embodiments with reference to the accompanying drawings in which.

DESCRIPTION OF THE PREFERRED EMBODIMENTS

The objects, characteristics and advantages of the resent invention will be more clearly understood through the preferable embodiments referring to the attached drawings.

Since the terms mentioned later are judged based upon the function of the present invention and they can be changed according to the technician's intention or a usual practice, the terms should be judged considering the overall contents of the specification of the present invention.

Figure 1:
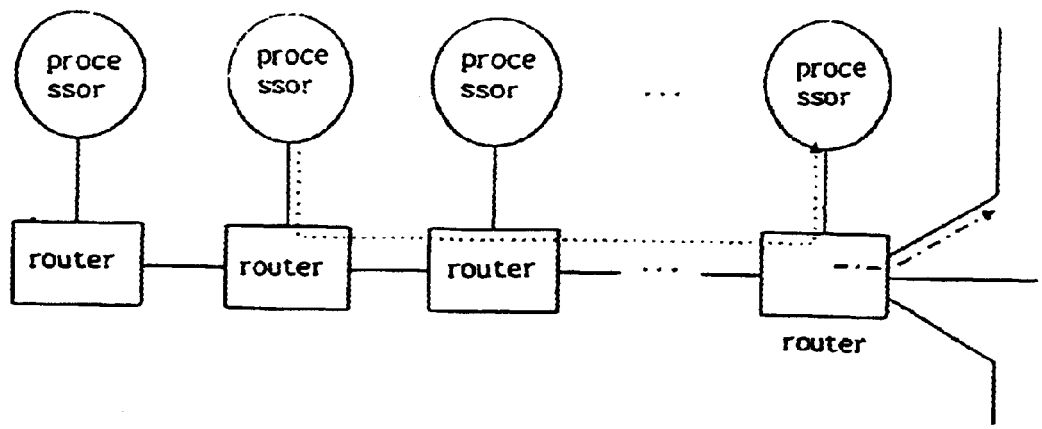
FIG. 1 is an illustration useful in explaining the prior art point-to-point link connection mode.
Figure 2:
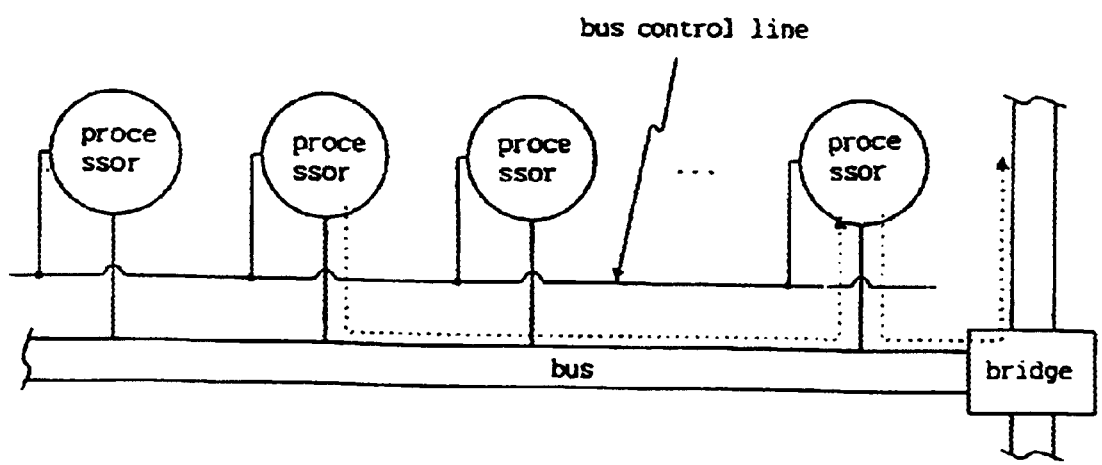
FIG. 2 is an illustration useful in explaining the prior art bus connection mode.
Figure 3:
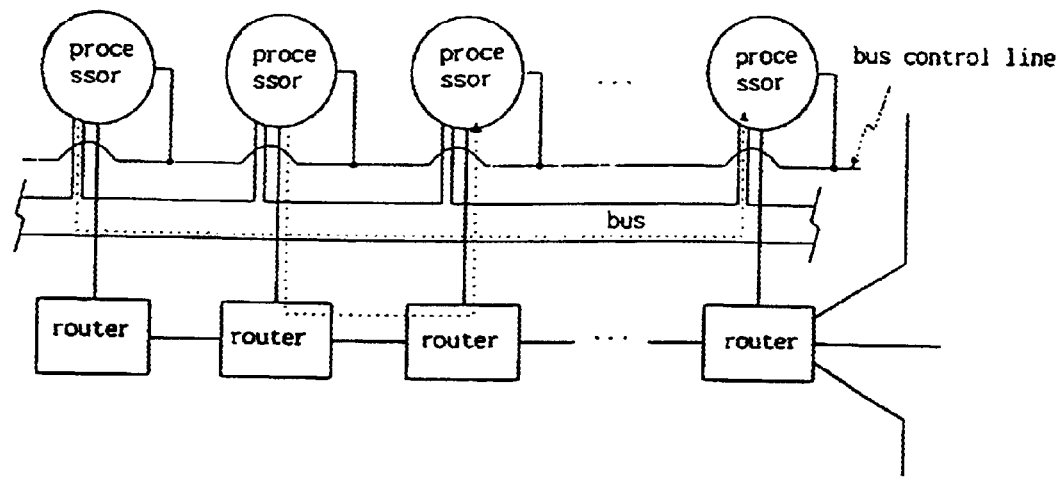
FIG. 3 is an illustration of one dimensional array having the dualized connection network.
Figure 4:
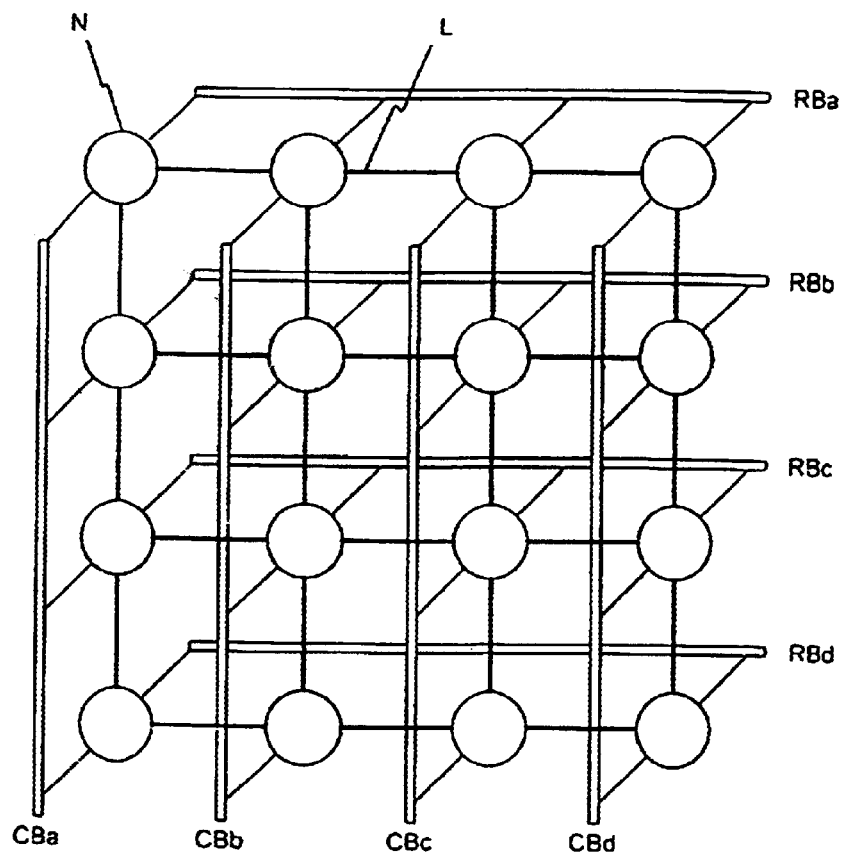
FIG. 4 is a view showing the architecture of two dimensional mesh communication network comprising physical row and column bus having the dualized connection network.
Figure 5:
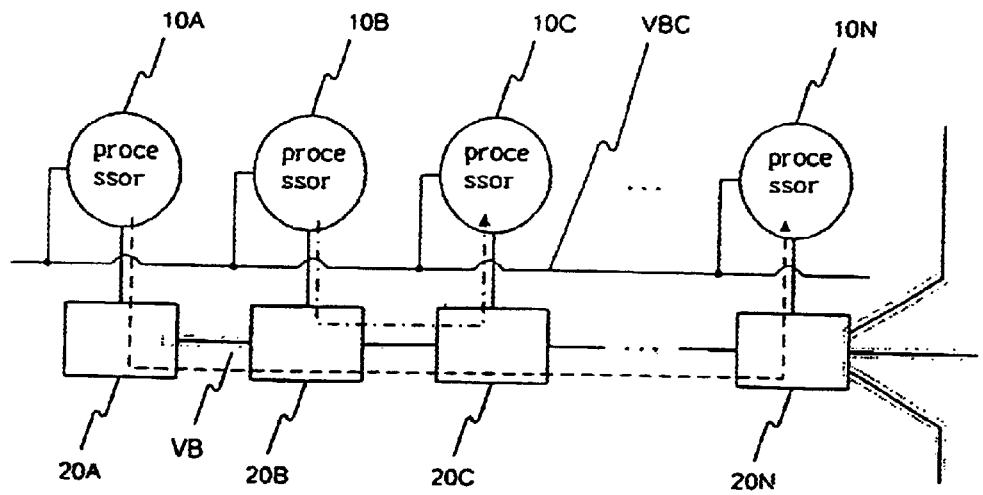
FIG. 5 is an illustration of one dimensional array using a virtual bus according to the present invention.
Figure 6:
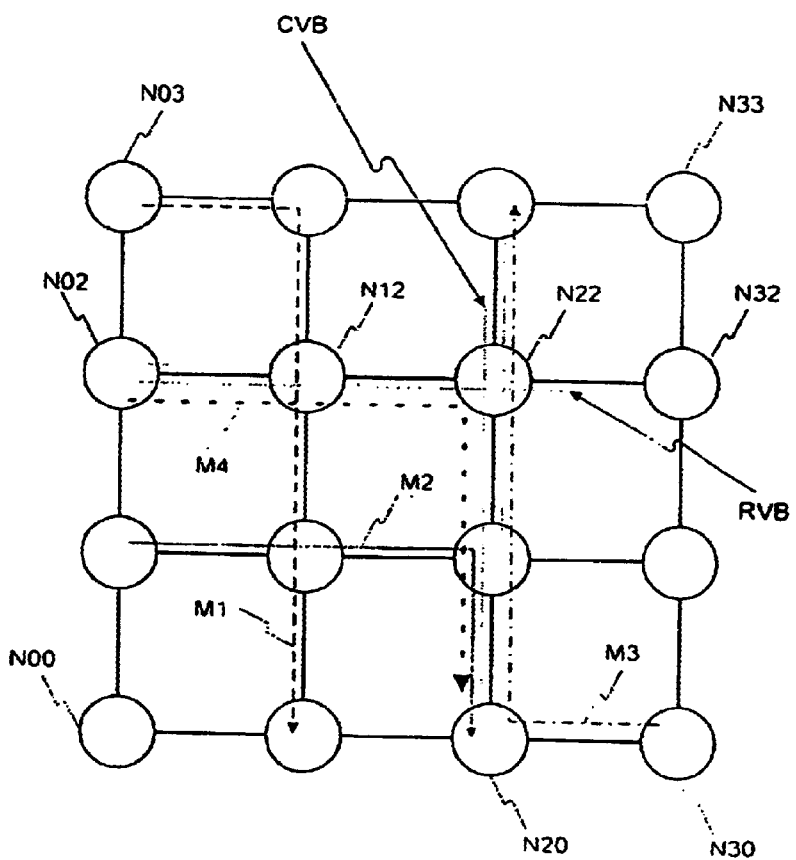
FIG. 6 is a view showing the architecture of two dimensional mesh computer of using virtual buses according to the present invention.

FIG. 5 is an illustration of one dimensional array using virtual bus according to the present invention, and FIG. 6 is a view showing the architecture of two dimensional mesh computer of using virtual buses according to the present invention.

In FIG. 5, the data path of the virtual bus VB is physically shared with a point-to-point link, and some of bus control lines is connected to a common line like the prior bus. The virtual bus VB is virtually established via point-to-point link only when urgent messages or broadcasting messages to be transmitted through the bus are generated.

That is, if a bus operation is not required, point-to-point link transmission messages are normally transmitted via the link. At this time, if a bus operation is required, the transmission of the messages in transmitting via the prior link is frozen and the virtual bus is established via point-to-point link. Also, the virtual bus preferentially uses the link as a data transmission path only in case of needing a bus operation.

The data transmission of the virtual bus is implemented by a wave pipelining mode set forth later. An operating method of virtual buses will now be described below with reference to FIG. 6. Message ID means message generation order. We assume that transmission time of four messages M1 to M4 is overlapped. is That is, the fourth message M4 is generated before the transmission of the first message is completed. The point-to-point messages, first message M1 to the third message M3 may be transferred concurrently because required channels are disjointed each others.

At this time, node N02 generates a multicast message M4 which goes to destination nodes N12 and N20. Two virtual buses CVB and RVB are established after arbitration process. One bus is the virtual bus RVB from node N02 to node N32 situated on the second row, and the other is the virtual bus CVB from node N20 to node N23 situated on the second column.

The node 22 is the bridge of two virtual buses. Virtual buses have priority over point-to-point link communication. Therefore, the second message M2 on the path in the establishing process of virtual buses stops by freezing process in which data on the link is stored in the buffer of a router, until the transmission of the fourth message M4 is completed. At this time, the third message M3 continues to be transmitted regardless of the existence of virtual buses. Because the third message is transmitted in the opposite direction from the data transmission of virtual buses.

The fourth message M4, which secures transmission path by way of the freeze process, is transmitted through virtual buses. If the transmission of the fourth message M4 is completed and the virtual buses are removed, then the second message M2 stored in the buffer of the router is restored and retransmitted.

In order for the virtual buses to support unicast, multicast and broadcast communication, communication protocol must be defined for operating the virtual buses. This will be described in detail later. The router architecture of mesh computer with virtual buses will now be described below with reference to the accompanying FIGS. 7 and 8.

Figure 7:
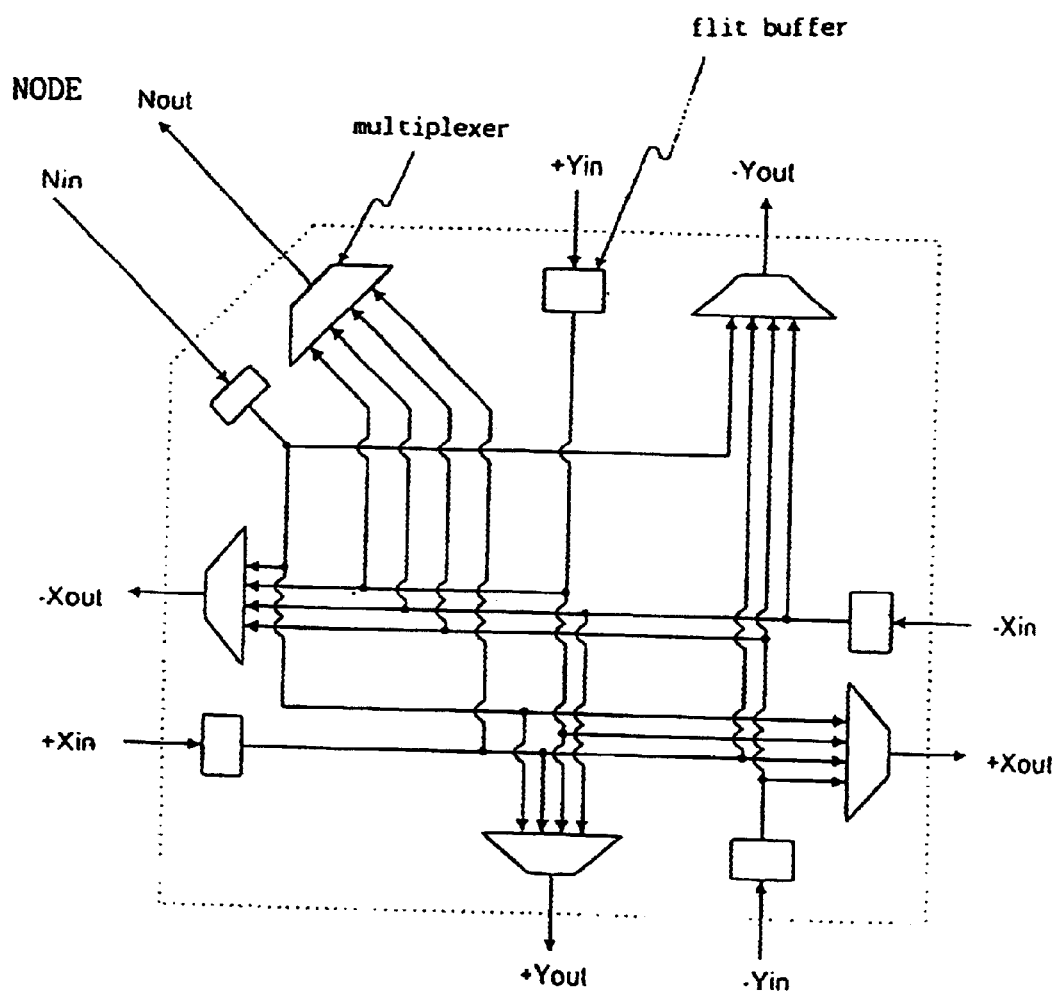
FIG. 7 is an illustration of the prior art router architecture useful in explaining the router architecture according to the present invention.
Figure 8:
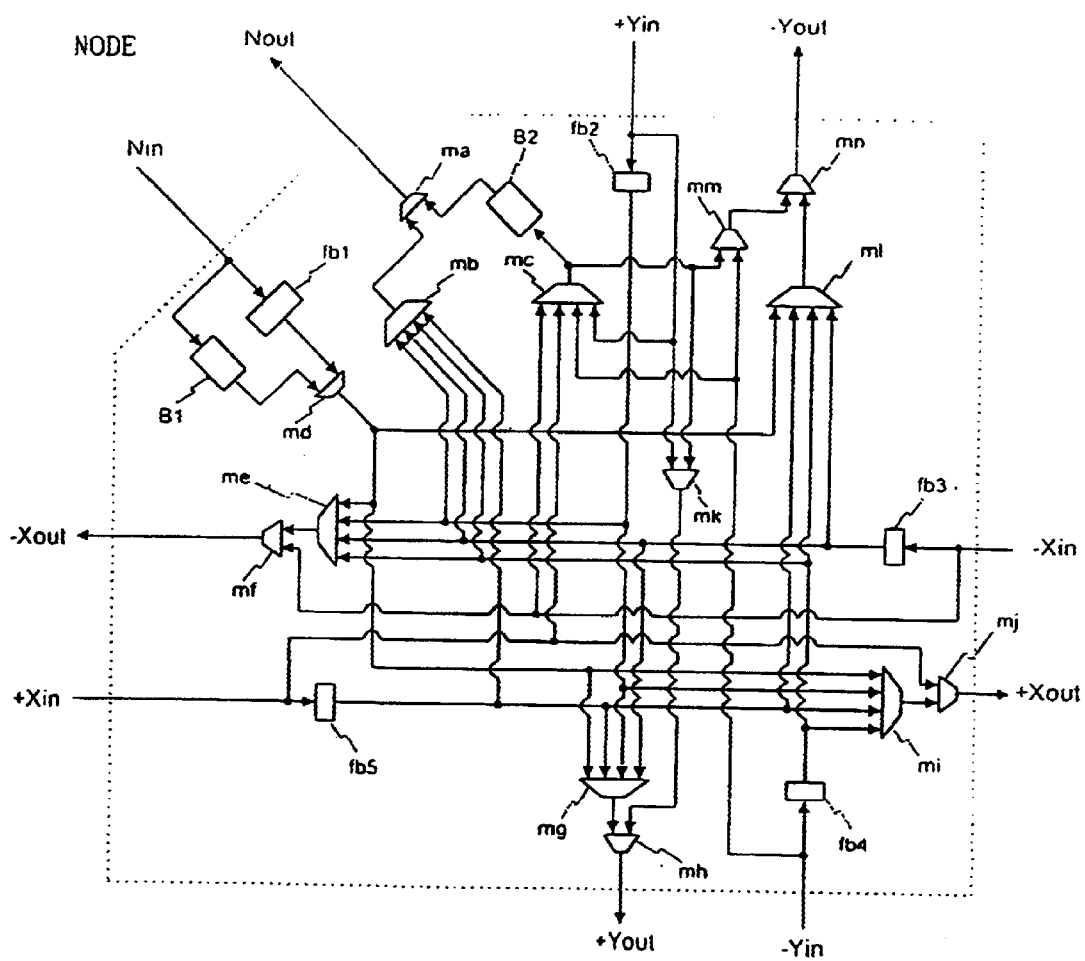
FIG. 8 is an illustration of the router architecture according to the present invention.

FIG. 7 is an illustration of the prior art router architecture useful in explaining the router architecture according to the present invention, and FIG. 8 is an illustration of the router architecture according to the present invention.

First, FIG. 8 shows the data path added to the base two dimensional router for virtual buses, in relation to the data path within the router for the virtual buses.

The router architecture capable of applying a virtual. bus concept may be applied to a cut-through router such as a wormhole router and a circuit switching router, which are widely used for the connection architecture of a multicomputer. In order to easily explain, the base router is defined as the wormhole router.

Therefore, the wormhole router widely used as the base router in the multicomputer will be described in brief with reference to FIG. 7. This wormhole router splits messages into small units called flit (flow control digit) and transmits data using a pipelining mode. At this time, the wormhole router is comprised of the small number of flit buffer and link resources, and includes two unidirectional links for each direction.

The architecture shown in FIG. 8 adds a circuit for data path of virtual buses to the wormhole router shown in FIG. 7. In such architecture, a bypass path capable of traversing the router from input to output is required when applying virtual buses for the respective links of the four directions.

In order to implement the above, a 2 to 1 multiplexers mf, mh, mj and mm are required at the final stage of each output, and further multiplexers ma and md are required to bypass an input/output buffer close to a processor of the node.

The multiplexers isolate the flit buffer and directly connect the input to the output in order to establish the virtual buses. That is, after all routers in a row or a column set up their bypass paths, the virtual bus for one row or one column is established.

If the source and destination nodes belong to the same row or the same column, the message may be transmitted using a single row or a single column virtual bus. However, if they are in different rows and different columns, multiple virtual buses should be traversed.

The virtual buses are traversed in a dimensional order in order to prevent deadlock conditions. In two dimensional mesh networks, the row virtual bus is used first, and then the column virtual bus is used.

In order to support the bridging from the row virtual bus to the column virtual bus, data paths between them are required. Multiplexers mm, mk and mc are used for the bridging from the row to the column. In addition, the multiplexer mc is used for connection to the processor side, and also buffers B1 and B2 are used for connection to the processor side. Since virtual buses according to the invention use an end-to-end flow control instead of a link flow control, the buffer B1 and B2 are deep buffers capable of performing the end-to-end control.

Figure 9:
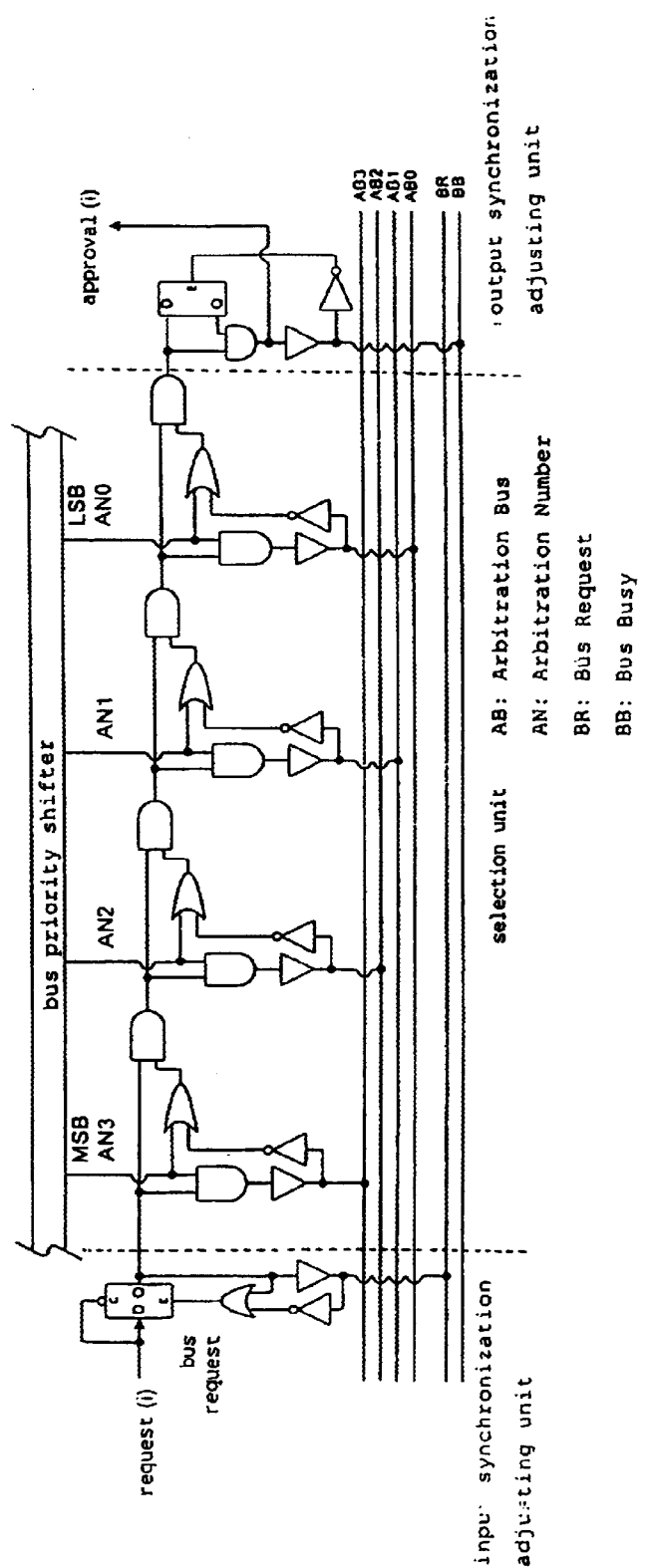
FIG. 9 is an illustration of the configuration of the arbitration circuit on single virtual bus.

The router having virtual buses as described above requires an arbitration logic for row and column buses. The arbitration logic circuit for virtual buses may utilize conventional one. A coded self-selection distributed arbitration circuit is utilized just for the advantages on freezing communication protocol and virtual bus transaction protocol set forth later. FIG. 9 shows the arbitration logic for a row and column bus in 16×16 mesh networks.

Next, the configuration and operation of the arbitration logic circuit will be described with reference to FIG. 9.

The distributed arbitration logic circuit is consisted of three stages: an input synchronization stage, a selection stage and an output synchronization stage. The synchronization stages prevent multiple nodes from carrying on bus transaction at the same time.

The selection stage compares its own bus priority with the priority of the other node which requires the bus transaction, and transfers the result to the next step. This circuit consists of $\log_2 k$ ($\log_2 16=4$ in 16×16 mesh) common lines, where k is the number of nodes on each row and column.

It is noted that all the nodes must have allotted opportunity in bus operations. The node which requires the bus transaction must not be awaited forever or for a long time unfairly, such as starvation conditions.

Therefore, the invention suggests the following method for the fair use of virtual buses.

Figure 10:
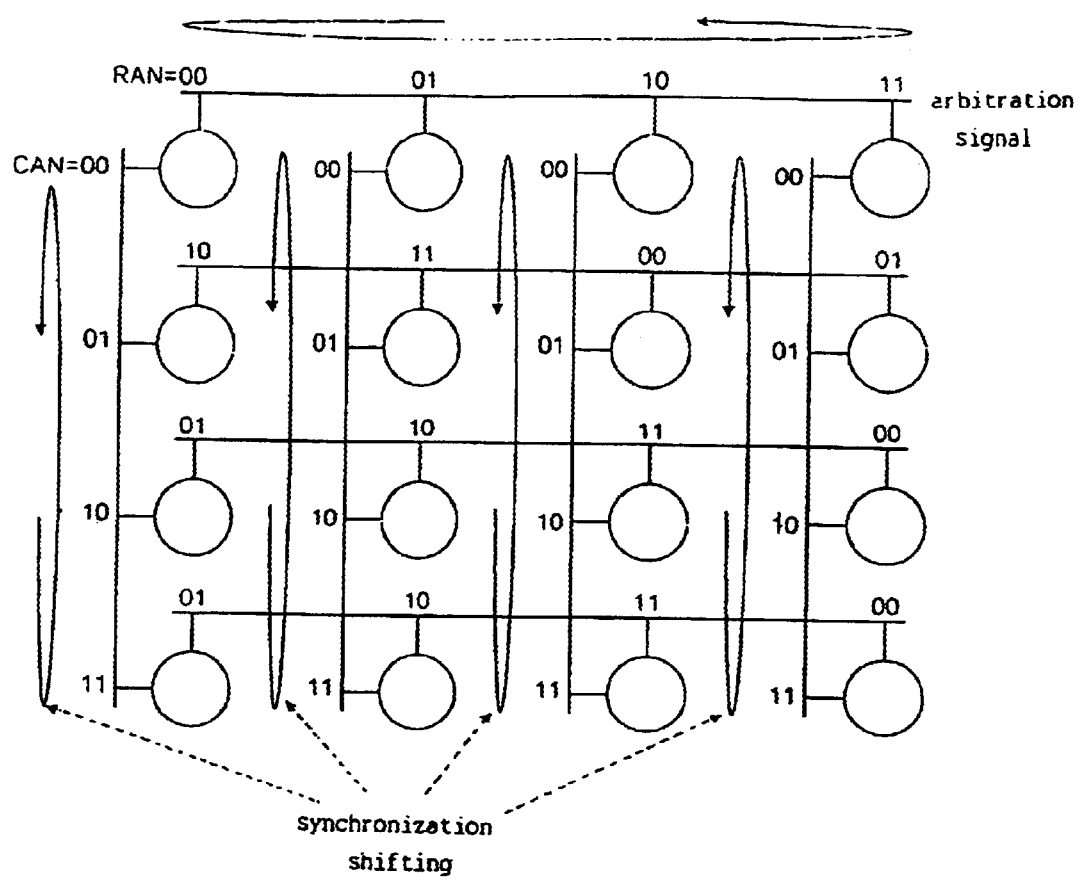
FIG. 10 is an illustration useful in explaining the solution on the starvation condition.

First, the row virtual bus independently increases the bus priority of the respective nodes by way of a bus priority shifter shown in FIG. 9. This operation is performed simultaneously and periodically. The priority of the node with the maximum value becomes zero. All the nodes on the same row have an equal opportunity to the row virtual bus by rotating the priority of a row virtual bus as above. The bus priority to the column virtual bus rotates like that of the row virtual bus, but the column virtual bus alters simultaneously the priority of all the columns as shown in FIG. 10 unlike the row virtual bus. In this way, all the nodes on the same column have an equal opportunity to the column and further the probability of deadlock conditions is remarkably decreased.

The deadlock conditions are not generated, since virtual buses are used in order of the row virtual bus and the column virtual bus by dimensional order in the case of an unicast communication using virtual buses. However, the deadlock conditions (FIG. 11) may also be generated since the several column virtual buses are occupied at the same time in the case of a multicast communication.

Example for the deadlock conditions is described with reference to FIG. 11. This example is the case that the message passed over from node N11 to nodes N02 and N22, and the message from node N10 to nodes N01 and N21, utilize virtual bus at the same time.

Figure 11:
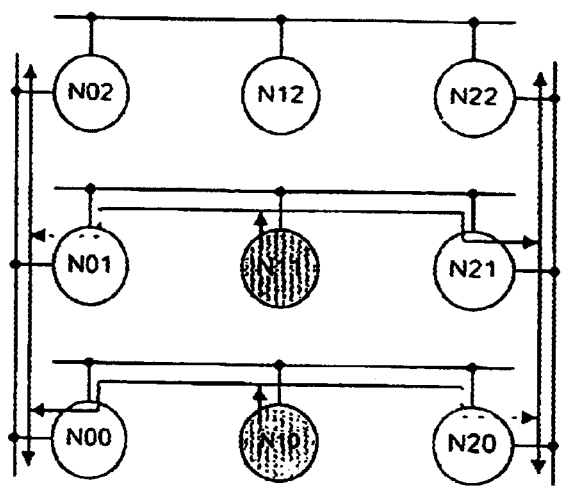
FIG. 11 is an illustration useful in explaining the deadlock condition.

In FIG. 11, the solid line represents an preoccupied part, and the dotted line represents an occupation trying part. At this time, each message may await the occupation of column virtual bus which is occupied by the other side. In this case, the deadlock conditions may be generated.

In order to prevent the deadlock conditions, when a message does not occupy all the virtual buses needed to transmit even after passing the definite time, the message abandons the occupation of the preoccupied buses and then tries to retransmit after passing the definite time. This is accomplished by adding a timeout function to the arbitration circuit of the virtual bus.

Here, the definite time uses an exponential function method utilized in Ethernet, namely, the method in which the definite time is increased by 2 times as the retrial number is increased. Therefore, the occupied virtual buses are occupied only for the definite time so as to avoid the deadlock conditions.

The deadlock conditions are rarely generated only when two certain nodes request the setting of virtual buses at almost the same time. In particular, since all the column virtual buses on certain row virtual bus have the equal priority by the synchronization rotation of the priority of the column virtual bus introduced in order to prevent the starvation conditions mentioned above, the deadlock conditions is naturally prevented in an arbitration process of the column virtual buses. In practical, the deadlock conditions is rarely generated. Consequently, an average communication time is not substantially increased due to the deadlock conditions.

The technical means for arbitrating virtual buses was described up to now. As described above, since communication messages using virtual buses have priority over point-to-point communication messages, point-to-point communication messages using link overlapped with the virtual buses when forming the buses must be stored in the buffer of router without loss by way of a freeze process. The communication protocol of the freeze process is provided for this.

The communication protocol of the freezing process according to the invention is described with reference to FIG. 12.

Figure 12:
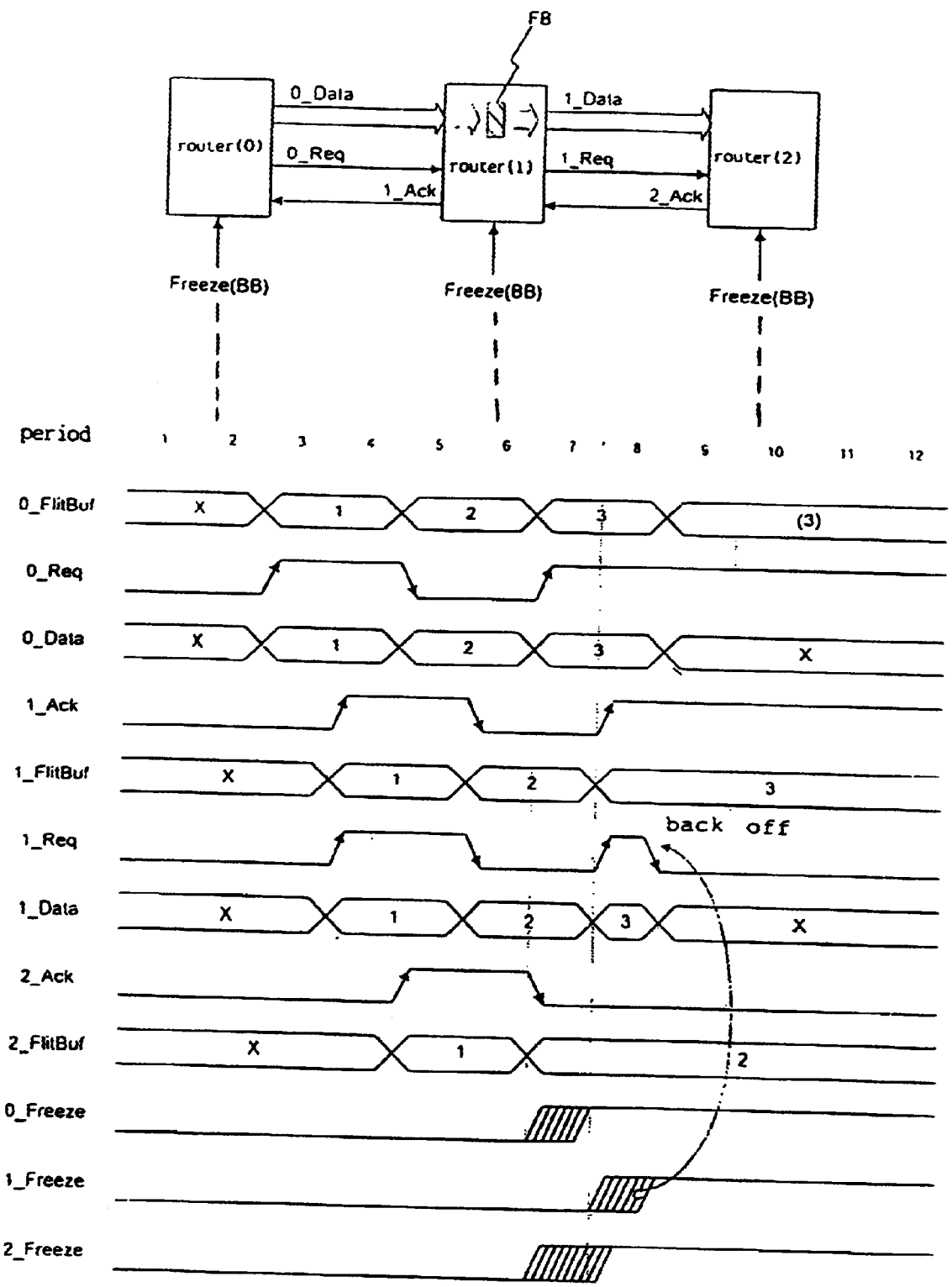
FIG. 12 is an illustration useful in explaining the freezing communication protocol in the flow controls on link according to the present invention.

FIG. 12 shows two cycle handshaking protocol, the representative communication protocol of a cut-through router such as a wormhole router and a freezing communication protocol of the case of establishing virtual buses based upon the handshaking protocol.

In the freeze process, messages on the virtual buses are stored in the flit buffer of the router. At this time, it is important not to lose and not to duplicate data flits.

The operation of virtual buses is initialized by a bus busy signal line connected to a common line via the arbitration circuit. The Freeze signal of FIG. 12 is an internal signal line connected to the arbitration circuit of the virtual bus.

In the case of the encoded distributed arbitration, the freeze signal is directly connected with the bus busy signal of external common line. Since routers on one row or one column see the freeze signal at almost same time, they are frozen according to the state of the instant of seeing the freeze signal. However, the communication protocol of the freeze process deals with the rare situation that all nodes do not see the freeze signal at the same time.

First, periods 1 to 6 of FIG. 12 shows the base two cycle signalling.

The handshaking signals between two routers are comprised of Req and Ack control signals. In FIG. 12, *_Data represents the data present on the link, and *_FlitBuf represents data stored in the flit buffer FB of the router.

For simplicity, there is only one flit buffer between input and output channels. The numbers on the *_Data and the *_FlitBuf are the sequence numbers of flits. The signal names begin with the node ID that drives the signal.

If a transmission side sends data with a request signal, a reception side sends an acknowledgment signal with data receipt. That is, the reception side waits for its own flit buffer to become empty, and then it latches data on the link in the flit buffer and toggles the acknowledgment signal if the buffer is made empty.

Therefore, when a request signal is equal to the corresponding acknowledgment signal, the data is not driven on the link. Because transmission and reception do not exist or have been completed. On the other hand, when a request signal is different from the corresponding acknowledgment signal, the transmission side drives data on the link with transmission request. In this way, it is possible to transmit next data every two cycles by asserting control signal according to the toggling of the signal line, not the level of the signal line.

At this time, periods 7–12 of FIG. 12 shows the freeze process of ongoing messages of point-to-point link when asserting the freeze signals. It is noted that the data on the point-to-point link is not lost and the data is not stored doubly on the link. Here, the data includes the content stored in the flit buffer of the transmission side as well as the data present on the link. Accordingly, it is noted that the transmission side must recognize whether the reception side has stored the data on the link in its own flit buffer or not.

First, when the request signal is equal to the corresponding acknowledgment signal, there is not meaningful data on the link. Therefore, the freeze process is completed, if each router stops communication according to the present state.

On the other hand, when the request signal is different from the corresponding acknowledgment signal, two cases are considered. In principal, it is noted that whether the reception side may store the data present on the link or not when asserting the freeze signal. However, the transmission side may not know that, and further may not only wait when not being stored by the reception side.

Therefore, when the freeze signals were asserted, the transmission side sends the signal, namely, a backoff signal, with the meaning that ignores the data present on the link to the reception side, by toggling the request signal before receiving the acknowledgment signal. Since such communication protocol is generated in parallel, the reception side does not recognize the backoff signal and normally may toggle the acknowledgment signal so as to store the data. Consequently, the routers of transmission and reception ends synthesize the backoff signal and the acknowledgment signal so as to determine use or disuse of the data in the flit buffer.

First, if the reception end toggles the acknowledgment signal and then receives the freeze signal in the state of having an empty flit buffer, regardless of the backoff, the reception end is frozen after storing new received data in the flit buffer. Since the transmission end also has known that the reception end stores safely the data present on the link regardless of the backoff, the transmission end is freezed after the backoff, the transmission end is frozen after discarding the data, in order to prevent overlapping of the data in its own flit buffer. This case is the relation of routers 0 and 1 in FIG. 12.

Second, the reception end receives the freeze signal in the state not of sending the acknowledgment for the data present on the link because the flit buffer of the reception end is full. In this case, the reception end waits until receiving the backoff signal. Also, the transmission end receives the freeze signal a little later, and thus sends the backoff signal. The reception side detects this signal, and is frozen after ignoring the data present now on the link. Further, the transmission side confirms no acknowledgment of the reception side and preserves the content of its own flit buffer at present. This case is the relation of routers 0 and 1 in figure.

Based upon the suggested communication protocol, the prior messages in transmitting via the point-to-point link are stored in the flit buffer of the router, without loss and overlapping of data. If the use of the virtual bus is completed and the freeze signal is removed, the message transmission frozen by the handshaking signal may be continued by the data stored in the flit buffer.

By way of the above processes, the brief configuration of the router for the use of virtual buses, the arbitration function and the freeze function for preventing conflict between point-to-point link data and virtual bus data were explained. The data transmitting method of virtual buses will be described below.

Once the virtual bus is established, the source node of message may send data to a plurality of nodes at the same time. In the case of using both row and column virtual buses, data on the virtual bus are transmitted by bypassing the flit buffers and switching devices of the intermediate nodes, in dimensional order, using a wave pipelining, without an intermediate buffering. It is very similar to the data transmission in circuit switching communication networks. Whereas the circuit switching is set up by probe messages, the virtual bus is established by the row and column buses through the arbitration processes.

Figure 13:
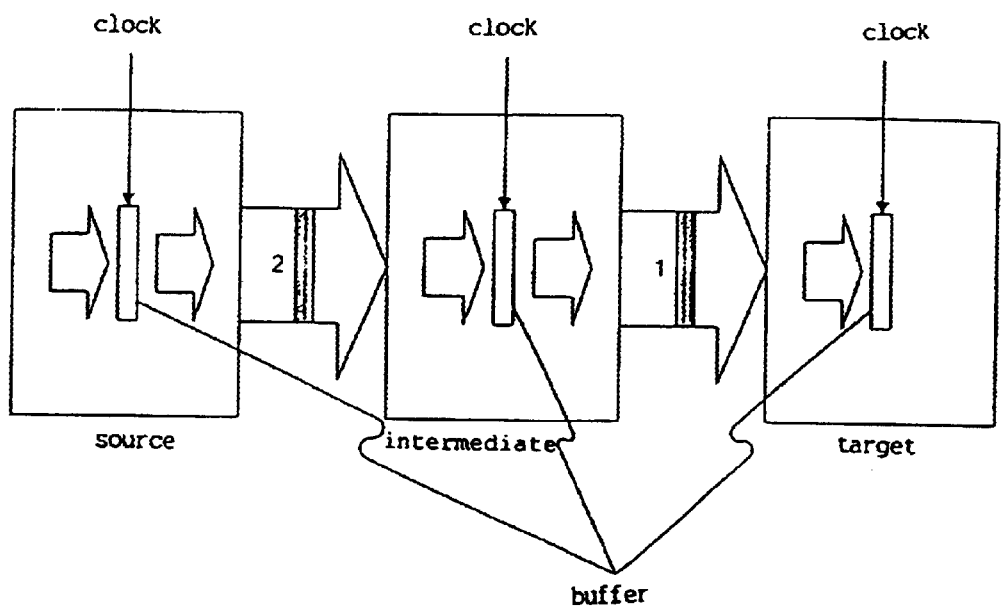
FIG. 13 is an illustration useful in explaining a conventional pipelining.

FIG. 13 shows a typical pipelining in link level flow control, which is widely used in cut-through routers such as a wormhole router. In this scheme, the data skew between data lines is smaller than that of the circuit switching since the data is latched in all the intermediate routers. However, the datapath delay for a intermediate routr is longer than that of the circuit switching networks.

Figure 14:
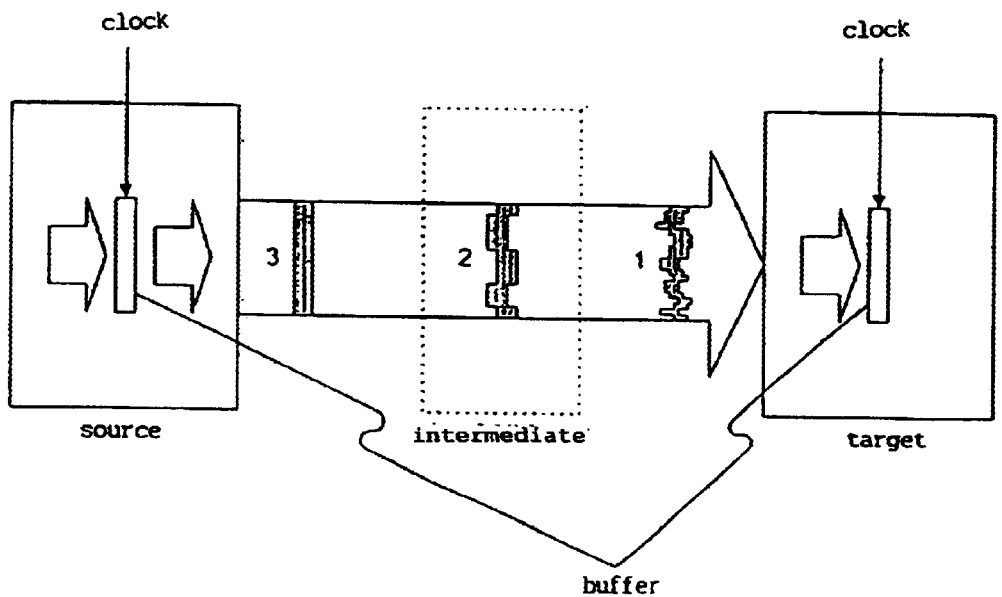
FIG. 14 is an illustration useful in explaining a wave pipelining.

FIG. 14 shows the wave pipelining through end-to-end (from the source node to the destination node) routers of the message. In this case, the datapath delay is faster than that of the ordinary pipelining, like the circuit switching communication networks. Unlike the conventional circuit switching networks, the data transmission is pipelined through overall combinational gates between source and destination.

In general, the circuit switching ensures the delay time through end-to-end and then transmits the next data. Therefore, only one data wave exists between end-to-end like an ordinary pipelining. However, the wave pipelining continuously transmits data with time interval of the data skew between end-to-end, and multiple data waves exist between end-to-end as shown in figure. Accordingly, it is possible that the wave pipelining transfers the data faster than an ordinary circuit switching.

That is, the paper of Duato et al. described in References shows that the wave pipelining may transfer messages four times faster than the wormhole router, based upon the Chien's switch model and the Spice simulation for their designed router.

In the virtual bus, the strobe signal follows the same paths as the bus data. The tail bit signal of conventional routers is used for the strobe signal of the virtual bus. The destination nodes present on the virtual bus recognize the strobe signal transferred with data wave, and store the data on the bus in its own buffer.

Wave pipelining speed is limited by the data skew among the data lines including the strobe. It is, however, possible to simulate the amount of skewing, and adjust each data lines, with the aid of state-of-the-art CAD tools. As described in the paper of Duato, the transmission speed of the virtual bus may be faster than that of the prior router by this effort.

Figure 15:
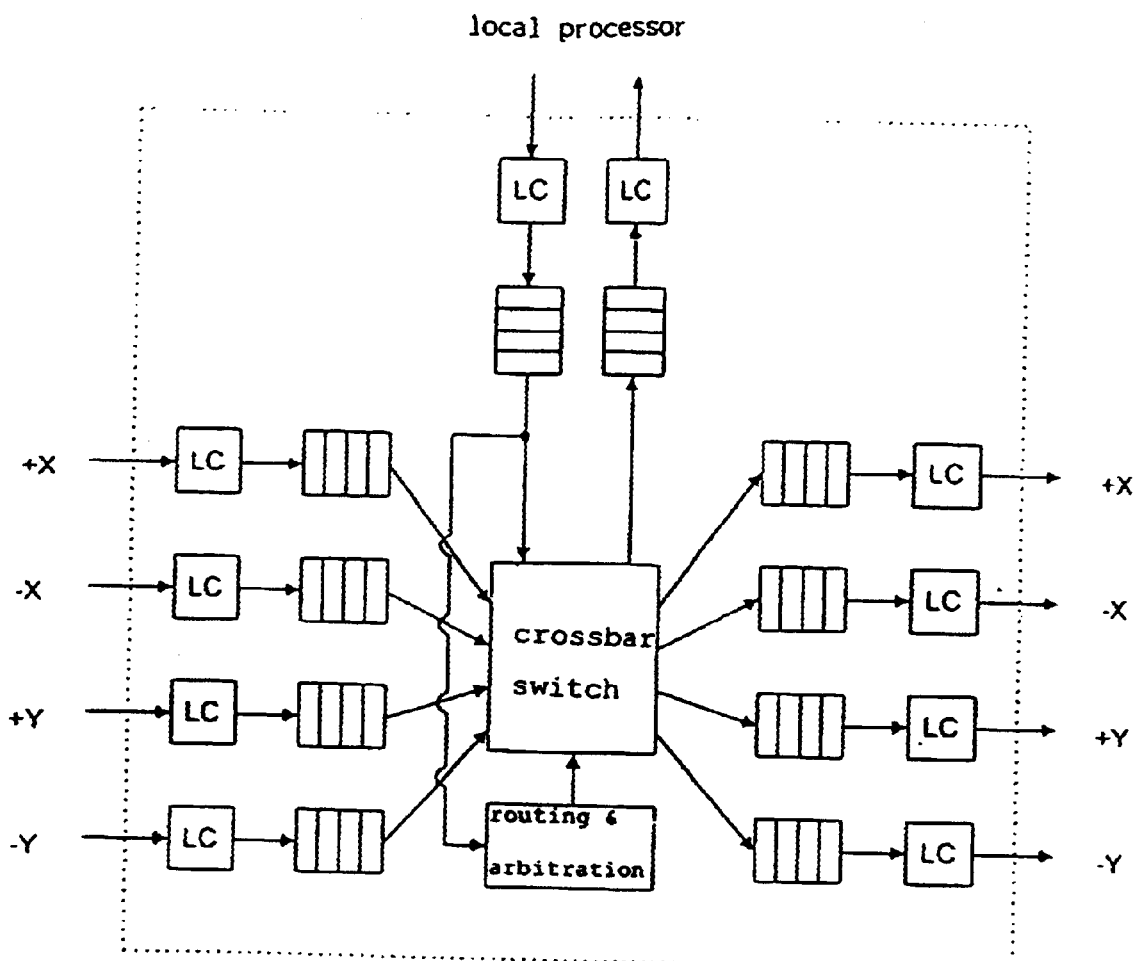
FIG. 15 is an illustration of the prior art router architecture useful in explaining the router architecture according to the present invention.

The overall configuration of the router is described below with reference to FIGS. 15 and 16. FIG. 15 shows a general cut-through router, and FIG. 16 shows two dimensional cut-through router having the virtual bus functionality.

Figure 16:
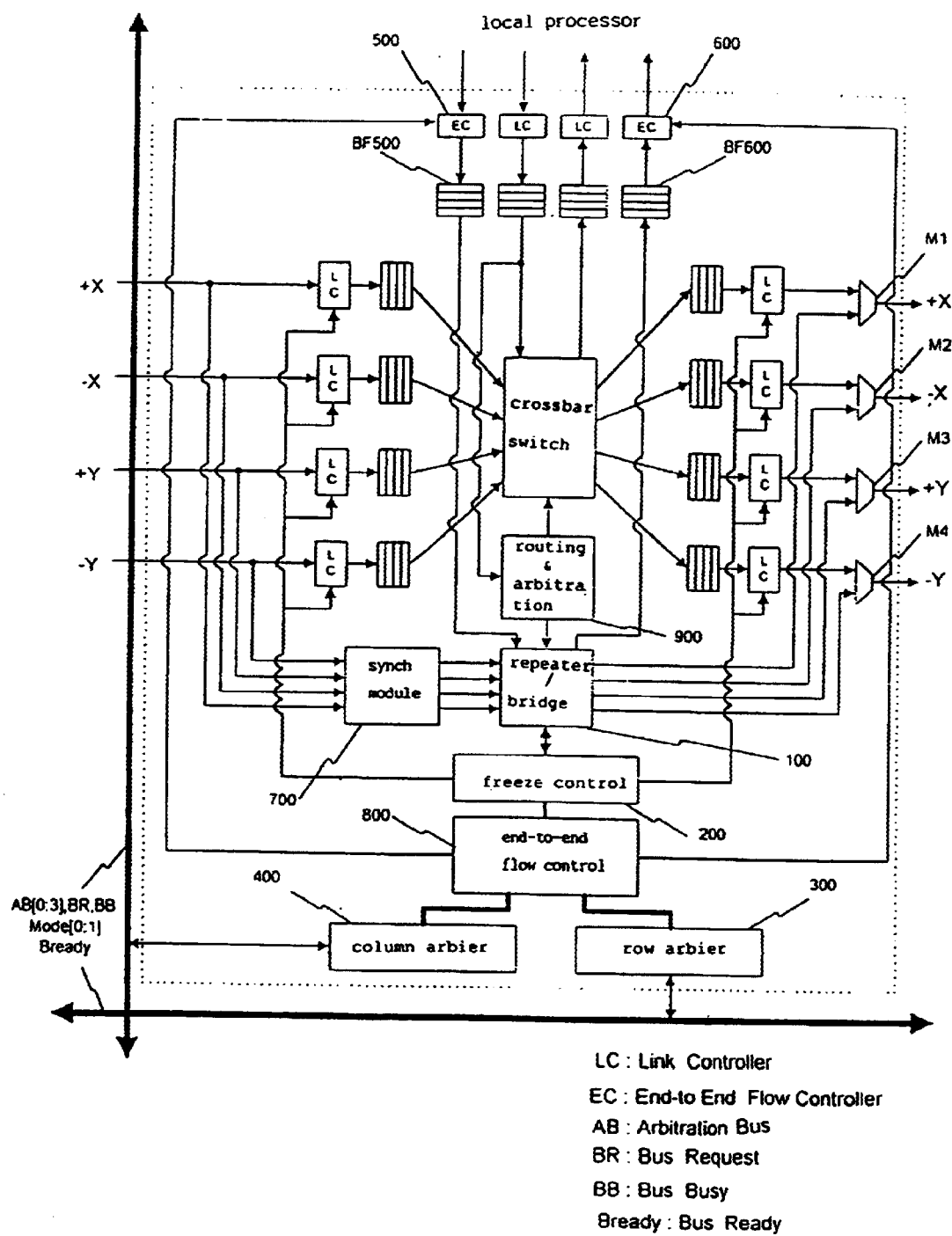
FIG. 16 is an illustration of the router architecture according to the present invention.

The overall configuration of the router having the virtual bus functionality shown in FIG. 16 comprises several modules corresponding to the explained parts. A repeater/bridge 100 of FIG. 16 includes main parts of the data path for the virtual bus shown in FIG. 8. The main parts are a repeater part for establishing virtual buses in the same dimension and a bridge part for bridging, from X dimension to the virtual bus of Y dimension, or from the virtual bus to processor. That is, FIG. 8 shows the repeater/bridge indicated with reference number 100 in FIG. 16 and a crossbar switch without reference number.

In addition, a freeze signal controller 200 is the freezing communication protocol controller explained above, and an end-to-end flow controller 800 is the part for controlling flow through end-to-end. An end-to-end control is achieved by allowing EC 500 and 600 (end-to-end flow controller) to control buffers BF500 and BF600 for connection with the processor.

In particular, a reception buffer controller 600 always monitors the amount of an empty space in the buffer. The reception buffer controller 600 monitors whether a buffer space as much as the data pipelined through the routers by the wave pipelining remains or not. If the buffer space is not enough, the transmission is interrupted for a while, by informing the source node of it using a control line, bus ready signal line Bready for the virtual bus. By this way, the flow control through end-to-end is accomplished.

Further, a column arbiter 400 and a row arbiter 300 represent the arbitration circuit of FIG. 9 mentioned above. They respectively exist independently on dimension and instruct the initiation of the freeze process.

Additionally, a synchronization module 700 is a synchronization circuit which controls gate delay according to each line, and lessens the data skew between data lines in the virtual bus in maximal.

Figure 17:
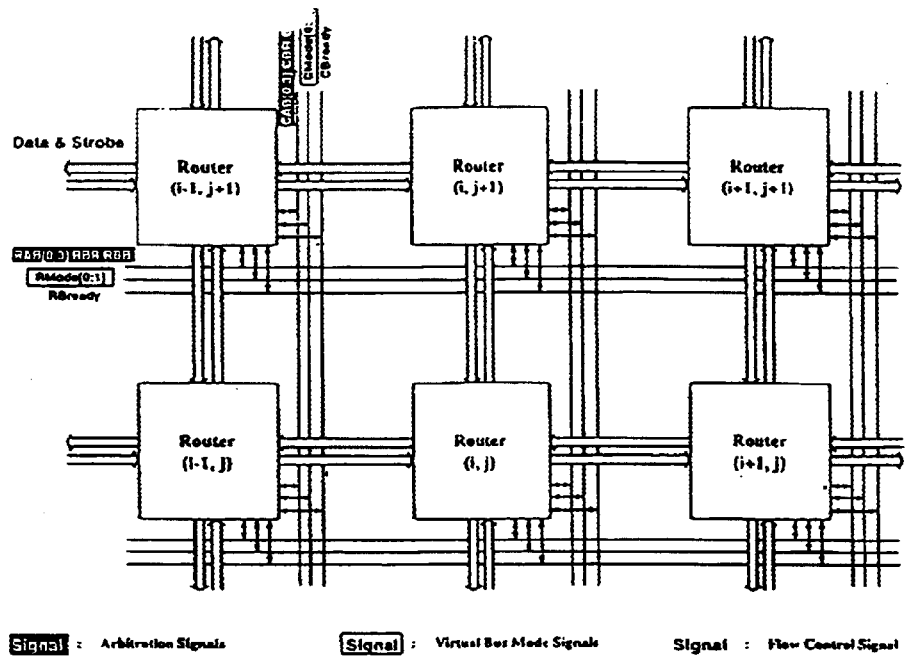
FIG. 17 is an illustration useful in explaining mesh architecture using virtual buses and signal lines for virtual buses according to the present invention.

Before the system configuration of mesh computer having virtual buses, which apply the overall router architecture as described above, is described, the virtual buses for 16×16 mesh architecture will be first described with reference to FIG. 17.

An external arbiter is not needed, because virtual buses use the distributed arbitration mode. In FIG. 17, signals for the row virtual bus are prefixed with R, and those for the column virtual bus with C. An arbitration bus RAB[0:3] and CAB[0:3], bus request signal lines RBR and CBR, and bus busy signal lines RBB and CBB are for the bus arbitration. Also, bus mode signals RMode[0:1] and CMode[0:1] are information about bus transaction types such as unicast, multicast, and broadcast.

Bus ready signals RBready and RCready are wired-OR signals. In fact, these signals are used as negative meaning. That is, the signal is asserted in cases where the pertinent router is not ready, while the signal is deasserted in cases where the pertinent router is ready. Therefore, even if the signal is asserted in cases where only one router is not ready, a message starting router decides that it is not yet ready since the signal value is asserted through the wired-OR.

The bus ready signals RBready and RCready have two purposes. One is related to virtual bus start-up procedure and the other is for end-to-end flow control of the virtual bus transaction. The virtual bus communication protocol is described below in order to explain the purposes of the bus ready signals RBready and CBready related to the start-up procedure of the virtual bus.

Table 1 shows mode signal values for various types of virtual buses. Therefore, the communication protocol according to the respective communication classes is described.

TABLE 1

Virtual bus transaction types

| RMode[0:1]/CMode[0:1] | transmission classes |
|---|---|
| 0, 0 | unicast |
| 0, 1 | multicast |
| 1, 1 | column broadcast |
| 1, 0 | broadcast |

First, an unicast communication is divided into a single bus transaction and two buses transaction.

When the source router wants to transfer data to the same row or column destination, only a single row column is involved in the bus transaction. Detailed protocol of a single bus unicast transaction follows.

Step 1. Source router asserts the internal Request to the local bus arbitration logic. Through the arbitration process, eventually, the row/column virtual bus will be granted to the source.

Step 2. When a router is trying to get the bus grant through the bus request BR, the other routers on the same row/column that realize it assert Bready signal.

Step 3. The source router asserts the bus busy BB and drives the unicast mode(0,0) on Mode[0:1] after successfully acquiring the row/column virtual bus. The other routers sensing these signals go to the freeze process.

Step 4. The source router drives the destination PID (process identification) through the virtual bus. The destination on the row/column of the PID deasserts Bready when it is ready to accept the bus data. On the other hand, other routers except the source and the destination on the same row/column deassert Bready immediately.

Step 5. The source router starts data transmission after sensing the deasserted Bready.

Next, the unicast communication of using row and column virtual buses is described with reference to FIG. 18.

Figure 18:
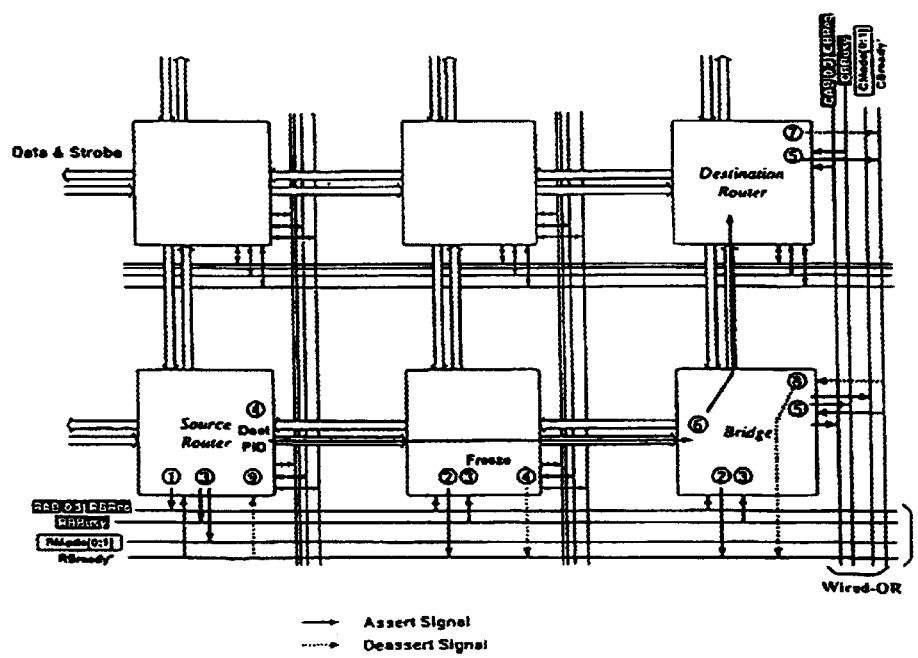
FIG. 18 is an illustration useful in explaining unicast transmission procedure.

FIG. 18 is an illustration useful in explaining unicast transmission procedure in the system configuration of mesh computer.

Step 1. Source router asserts the internal row bus Request to the local bus arbitration logic.

Step 2. When a router is trying to get the bus grant through the row bus request RBR, the other routers on the same row that realize it assert RBready signal.

Step 3. The source router asserts the row bus busy RBB and drives the unicast mode(0,0) on Mode[0:1] after successfully acquiring the row virtual bus. The other routers sensing these signal go to the freeze process.

Step 4. The source router drives the destination PID through the row virtual bus. In this case, the router located in the same column as that of the destination should be a bus bridge. On the other hand, other routers except the source and the bridge on the same row deassert RBready immediately.

Step 5. The bridge requires the column bus arbitration.
Step 6. And then forwards the destination PID to its column bus after acquiring its column bus.

Step 7. The destination on the column of the PID deasserts CBready when it is ready to accept the bus data. On the other hand, other routers except the destination and the bridge on the same column deassert CBready immediately.

Step 8. Then, the bridge deasserts Rbready after sensing the deasserted CBready signal.

Step 9. The source router starts data transmission after sensing the deasserted RBready signal.

As before, the communication protocol related to the unicast communication was described. The communication protocol related to the multicast communication will be described below.

The transmission to multiple destinations on a row or a column is enough with only one virtual bus. However, in several cases the destinations are scattered so as to be distributed on multiple rows or columns. In this case, the multicast communication is the relation of one row virtual bus and several column virtual buses. At this time, because the deadlock conditions may be generated, in order to avoid the probability of the deadlock conditions, the bus grant for multiple column virtual buses is requested at the same time after taking the bus grant of the row virtual bus.

Step 1. Source router asserts the internal row bus Request to the local bus arbitration logic.

Step 2. When a router is trying to get the bus grant through the row bus request RBR, the other routers on the same row that realize it assert RBready signal.

Step 3. Source router asserts the row bus busy RBB and drives the multicast mode(0,1) on Mode[0:1] after successfully acquiring the row virtual bus. The other routers sensing these signals go to the freeze process.

Figure 19:
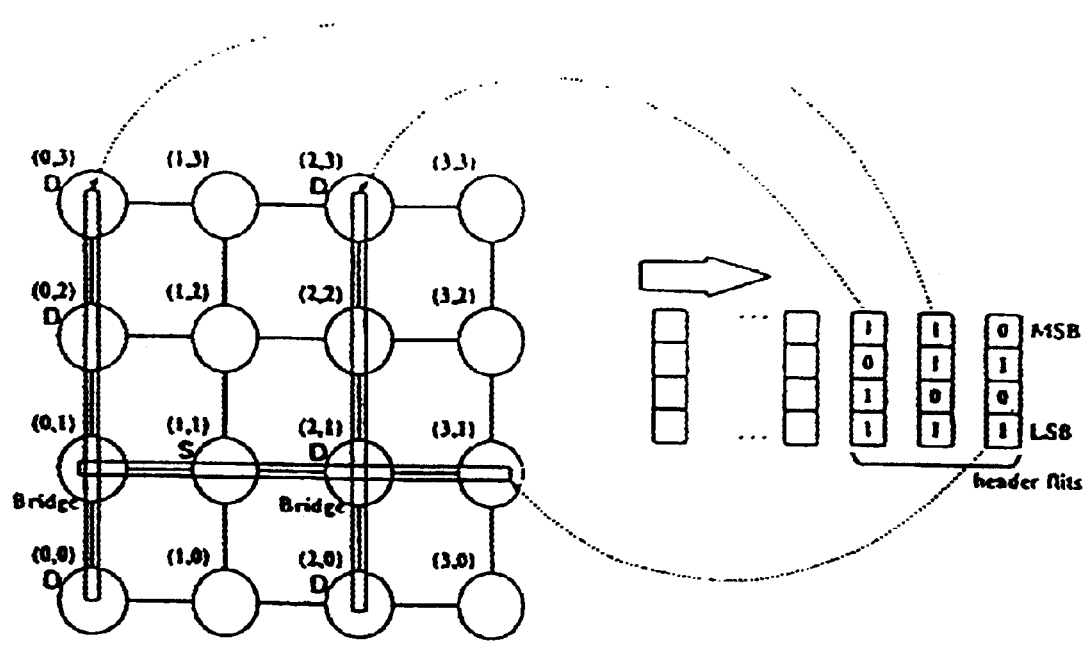
FIG. 19 is a view showing bit vector for multicast transmission.

Step 4. Source router drives the bit vector for bridges through the row virtual bus. In the 16×16 mesh networks, this bit vector consists of 16 bits, the number of row routers. For example, in 4×4 mesh the bit vector proceeds from node (1, 1) to nodes (0, 0), (0, 2), (0, 3), (2, 0), (2, 1), (2, 3) as shown in FIG. 19. The bridges require the column bus arbitration for acquiring those column bus. Unlike the unicast using row and column buses, the bridges deassert RBready after acquiring those column bus. On the other hand, other routers except the source and the bridge on the same row deassert RBready immediately.

Step 5. The source router transfers sequencing bit vectors for multidestination PIDs after sensing the deasserted RBready signal. The flit mumber of these bit vectors is the same as the number of involved bridges. Each flit is a bit vector for the destinations of those column bus. The bridges transfer a bit vector flit to the destinations of those column bus and reassert those RBready signals, and then forward the bit vector to the column bus. The destinations on those column bus are notified through this bit vector.

Step 6. The destinations on the column bus deassert CBready when they are ready to accept the bus data. On the other hand, other routers except the destinations and the bridge on the same column deassert CBready immediately. Then, bridges deassert RBready after sensing the deasserted CBready signal.

Step 7. The source router starts data transmission after sensing the deasserted RBready signal.

As before, the communication protocol related to the multicast communication was described. The communication protocol related to the column broadcasting will be described below.

The column broadcasting transmission broadcasts to all the nodes situated on the specific column. This broadcasting is useful in managing directories in distributed shared memory architecture.

Step 1. Source router asserts the internal row bus Request to the local bus arbitration logic.

Step 2. When a router is trying to get the bus grant through the row bus request RBR, the other routers on the same row that realize it assert RBready signal.

Step 3. Source router asserts the row bus busy RBB, and drives the column broadcasting mode(1,1) on Mode[0:1] after successfully acquiring the row virtual bus. The other routers sensing these signals go to the freeze process.

Step 4. Source router drives the bit vector for bridges through the row virtual bus. The bridge requires the column arbitration for acquiring those column bus. On the other hand, other routers except the source and the bridge on the same row deassert RBready immediately.

Step 5. All routers on the column bus of the bridge deassert CBready when they are ready to accept the bus data. Then, the bridge deasserts RBready after sensing the deasserted CBready signal.

Step 6. The source router starts data transmission after sensing the deasserted RBready signal.

As before, the communication protocol related to the column broadcasting communication was described. The communication protocol related to the broadcasting communication will be described below. The broadcasting transmission is a transmission mode participated by all the routers in system.

Step 1. Source router asserts the internal row bus Request to the local bus arbitration logic.

Step 2. When a router is trying to get the bus grant through the row bus request RBR, the other routers on the same row that realize it assert RBready signal.

Step 3. Source router asserts the row bus busy RBB and drives the broadcasting mode(1,0) on Mode[0:1] after successfully acquiring the row virtual bus. The other routers sensing these signals go to the freeze process.

Step 4. All routers on the row bus require the column arbitration for acquiring those column bus because all routers on the row bus are bridges.

Step 5. All routers on the column bus deassert CBready when they are ready to accept the bus data. Then, bridges deassert RBready after sensing the deasserted CBready signal.

Step 6. The source router starts data transmission after sensing the deasserted RBready signal.

As described above, the distributed computing system and the data communication method using the virtual bus in accordance with the present invention have effects that they may use the entire bandwidth of the communication network and transmit the data at high speed even in the case of using the only point-to-point link communication or using the virtual bus allocated actively, by transmitting the data of the virtual bus via the point-to-point link, not the common line, not like mesh architecture having the physical bus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A distributed computing system of one dimensional architecture having a predetermined number of routers, the connection among the respective routers being made in a point-to-point link, the respective routers being connected to an associated processor, said respective routers comprising:

means for forming a direct data transmission path between an input terminal and an output terminal corresponding to the array dimension of the routers in order for the respective routers to use the point-to-point link connected with router adjacent to the respective routers as one virtual bus on specific condition and in case of two dimensional arrays; and row and column control lines wire-ORed with the respective routers according to one dimensional architecture in which the respective routers are arrayed for exchanging information among the respective routers, said row and column control lines being driven when the means for forming a direct data transmission path is driven between the input terminal and the output terminal.

2. A distributed computing system having a predetermined number of routers, the connection among the respective routers being made in a point-to-point link, the respective routers being connected to an associated processor, said respective routers comprising:

means for forming a direct data transmission path between input terminal and output terminal corresponding to the array dimensional of the routers in order for the respective routers to use the point-to-point link connected with router adjacent to the respective routers as one virtual bus on specific condition and in case of two dimensional arrays;

row and column control lines wire-ORed with the respective routers according to architecture in which the respective routers are arrayed for exchanging information among the respective routers; and two dimensional architecture with the distributed computing system of one dimensional array driven by said row and column control lines being arrayed and formed in a hierarchical connection architecture when the means for forming a direct data transmission path is driven between the input terminal and the output terminal.

3. The distributed computing system according to claim 2, said respective routers when having two dimensional array architecture further comprising:

row arbitration means for informing and arbitrating another router of the row axis of information related to the row virtual bus formation via the row control line with a typical link-connected router;

column arbitration means for informing and arbitrating another router of the column axis of information related to the column virtual bus formation via the column control line with a typical link-connected router;

a link data freezing control unit for storing link data and preventing the link data from colliding in the bus data transmission;

repeater means for performing bypass function on virtual buses on row or column axis or bridge function from virtual bus to processor, said repeater means comprising link data transmission means for receiving and storing in a buffer row axis data inputted through the point-to-point link connected in a row axis in a first row direction or a second row direction opposite to the first row direction and column axis data inputted through the point-to-point link connected in a column axis in a first column direction or a second column direction opposite to the first column direction, and transmitting these data to the point-to-point link side connected in output direction transmissible to a destination router of the respective data, link data end-to-end communicating means for transmitting data to be inputted to the link data transmission means to processor side connected with the router or providing data outputted from the processor side to a destination router to send it to the link data transmission means, synchronization means for directly receiving data to be inputted to the link data transmission means and outputting a synchronized data when the input/output operations of the link data transmission means is suspended depending on the operation of the link data freezing control unit, transmission means for receiving the synchronized outputted data and outputting the data through the row-axis connected point-to-point link in the first row direction or the second row direction or outputting the data through the column-axis connected point-to-point link in the first column direction or the second column direction, multiplexers each included in the first and second row direction and the first and second column direction for receiving and selectively outputting data outputted from the transmission means and data outputted from the link data transmission means to that direction respectively, multiplexer for bypassing input/output in and from processor side, multiplexer for moving the virtual bus data for each direction, multiplexer for transmission for each direction and toward processor, and a repeater which consists of buffer unit for buffering the data between the virtual buses and the processors for forming the virtual bus in the same dimension;

an end-to-end flow control unit for controlling data transmission/reception between the virtual buses and the processors in cooperation with the operations of the repeater means;

shifting means for synchronization priority rotation on row virtual buses and synchronization priority rotation on column virtual buses for preventing starvation state and deadlock state of the row and column virtual buses; and a reception buffer control unit for monitoring whether or not the buffer space capable of storing data being pipelining by wave pipelining between source node of message and the router is remained, and if it is determined that the buffer space is insufficient, requesting transmission suspension for a while via the row control line and the column control line on the source node to drive the virtual buses.

4. A method for preventing link data from colliding with bus data when using link as virtual bus, in a distributed computing system comprising a predetermined number of routers being arrayed in mesh architecture, the connection among each of the routers being made in a point-to-point link, the respective routers including a direct data transmission path between an input terminal and an output terminal in row axis and column axis directions in order for the respective routers to use the point-to-point link connected with router adjacent to the respective routers as one virtual bus on specific condition; and row and column control lines wire-ORed with the respective routers according to row and column in which the respective routers are arrayed for exchanging information among the respective routers when the direct data transmission path included between the input terminal and the output terminal is driven to form the virtual buses, said method comprising the processes:

a first process for detecting a bus busy signal on the row control line and column control line and determining whether the operation of the virtual bus has been issued;

if it is determined that the operation of the virtual bus has been issued in said first process, a second process for determining whether or not a significant data exists on the link;

if it is determined that the data exists in said second process, a third process for transmitting a signal meaning that data on the present link must be ignored from transmission side of the link data to reception side;

a fourth process for transmitting a signal indicating the reception completion of the link data to the transmission side if the reception side receives and preserves the present link data before the reception side receiving the signal transmitted from the transmission side in said third process, and for not preserving the present link data if the reception side receives the signal transmitted from the transmission side in said third process before the link data being preserving in the reception side; and a fifth process for deleting the data preserved in the transmission side if the transmission side receives the reception completion signal of the link data transmitted from reception side to transmission side, and for preserving the transmitted data if the transmission side does not receive the reception completion signal of the link data transmitted from reception side to transmission side.

5. A data communication method using virtual buses including a function for preventing collision between link data and bus data when forming the virtual buses in a distributed computing system, in the distributed computing system comprising a predetermined number of routers being arrayed in mesh architecture, the connection among each of the routers being made in a point-to-point link, the respective routers including a direct data transmission path between an input terminal and an output terminal in row axis and column axis directions in order for the respective routers to use the point-to-point link connected with router adjacent to the respective routers as one virtual bus on specific condition; and row and column control lines wire-ORed with the respective routers according to row and column in which the respective routers are arrayed for exchanging information among the respective routers when the direct data transmission path included between the input terminal and the output terminal is driven to form the virtual buses, said method comprising the processes:

a first process for allowing a source router of a router trying to transmit data to select one mode among unicast communication mode, multicast communication mode, column broadcasting communication mode or broadcasting communication mode as the transmission mode of transmission data according to the kind of data or the position of a reception router;

a second process for allowing said source router to request the use of a row or a column virtual bus according to the data communication mode selected by said first process;

a third process for transmitting the data communication mode selected by said first process via said row or said column control line and informing the routers of it in the virtual bus if the bus grant is taken by said second process at the source router;

a fourth process for proceeding all the routers on the virtual bus taking the bus grant after said third process except for the source router to a link data freezing process;

a fifth process for allowing said source router to transmit information related to destination router(s) and bridge(s) via the formed virtual bus to set the destination router(s) and bridge(s);

a sixth process for allowing each bridge to perform operations similar to said second to fourth processes so as to form the virtual bus to the destination router(s) according to the information of the destination router(s) transmitted from said source router when the bridge(s) is set through said fifth process; and a seventh process for transmitting data at the source router if the virtual bus is formed through said sixth process between the source router and the destination router(s).

6. The data communication method according to claim 5, if it is determined that only one virtual bus is used after determining whether only either row or column virtual bus is used or row and column virtual buses are used according to the position of the destination in the case of selecting unicast communication mode among unicast communication mode, multicast communication mode, column broadcasting communication mode or broadcasting communication mode through said first process at the source router, said second to seventh processes comprising the steps of:

a first step for generating a bus requesting signal at the source router so as to request the use of row or column virtual bus;

a second step for switching a bus ready signal of all the routers attached to the same row or column into a first logic state while the source router tries to take the bus grant of the virtual bus;

a third step for allowing the source router to switch a bus busy signal into the first logic state and select the unicast mode as the transmission mode if the source router takes the bus grant of the virtual bus through said first step;

a fourth step for allowing all the routers except for the source router to proceed to the link data freezing process according to the bus busy signal switched into the first logic state in said third step;

a fifth step for allowing the source router to transmit the related information of the destination router through the virtual bus;

a sixth step for allowing the destination router to switch the bus ready signal preserved by said second step in the first logic state into a second logic state if the ready to receive the bus data is completed after said fifth step; and a seventh step for allowing the source router to transmit the bus data if the bus ready signal is switched into the second logic state.

7. The data communication method according to claim 5, if it is determined that row and column virtual buses are used after determining whether only either row or column virtual bus is used or row and column virtual buses are used according to the position of the destination in the case of selecting unicast communication mode among unicast communication mode, multicast communication mode, column broadcasting communication mode or broadcasting communication mode through said first process at the source router, said second to seventh processes comprising the steps of:

a first step for generating a row bus requesting signal at the source router so as to request the use of row virtual bus;

a second step for switching a bus ready signal of the row control line of the routers except for the source router situated on the same row into a first logic state while the source router tries to take the bus grant of the row virtual bus through said first step;

a third step for allowing the source router to switch a bus busy signal into the first logic state and select the unicast mode as the transmission mode if the source router takes the bus grant of the virtual bus through said first step;

a fourth step for allowing all the routers except for the source router to proceed to the link data freezing process according to the bus busy signal switched into the first logic state in said third step;

a fifth step for allowing the router situated on the same column as the destination router to set itself to a bridge as the source router transmits the related information of the destination router through the row virtual bus and simultaneously allowing all the routers in the row virtual bus except for the source router and bridge to switch the bus ready signal preserved by said second step in the first logic state into a second logic state;

a sixth step for allowing the bridge to transmit the related information of the destination router through the formed column virtual bus if the bus grant is taken after requesting the arbitration of the column virtual bus in order to connect the virtual bus from the bridge to the destination router;

a seventh step for allowing the router defined as the destination router by said sixth step to switch the column bus ready signal into the second logic state if the ready to receive the bus data is completed, on the other hand allowing the routers except for the bridge and destination router on the pertinent column virtual bus to immediately switch the column bus ready signal into the second logic state; and an eighth step for allowing the bridge to switch the row bus ready signal into the second logic state, and allowing the source router to confirm what the row bus ready signal is switched into the second logic state and to transmit the bus data, if the row bus ready signal is switched into the second logic state through said seventh step at the bridge.

8. The data communication method according to claim 5, in the case of selecting multicast communication mode among unicast communication mode, multicast communication mode, column broadcasting communication mode or broadcasting communication mode through said first process at the source router, said second to seventh processes comprising the steps of:

a first step for generating a row bus requesting signal at the source router so as to request the use of row virtual bus;

a second step for switching a bus ready signal of the row control line of the routers except for the source router situated on the same row into a first logic state while the source router tries to take the bus grant of the row virtual bus through said first step;

a third step for allowing the source router to switch a bus busy signal into the first logic state and select the multicast mode as the transmission mode if the source router takes the bus grant of the virtual bus through said first step;

a fourth step for allowing all the routers except for the source router to proceed to the link data freezing process according to the bus busy signal switched into the first logic state in said third step;

a fifth step for setting the routers themseves on the row virtual bus to bridges and switching the row bus ready signal into the second logic state and simultaneously requesting the use of the column virtual bus, as the source router transfers the bit vector formatted information for the router acting as the bridge of the multicast communication through the row virtual bus;

a sixth step for allowing the source router to continuously transmit the bit vector as many as the number of the bridges for the destination after confirming that the row bus ready signal is switched into the second logic state through said fifth step, and switching the row bus ready signal of the second logic state at present into the first logic state after each bridge preserves the destination bit vector corresponding to its own column;

a seventh step for allowing each bridge to transmit the destination bit vector stored via the formed column virtual bus through the column virtual bus if the bus grant is taken after requesting the arbitration of the column virtual bus in order to connect the virtual bus from the bridge to the destination router;

an eighth step for allowing the router defined as the destination router by said seventh step to switch the column bus ready signal into the second logic state if the ready to receive the bus data is completed, on the other hand allowing the routers except for the bridge and destination router on the pertinent column virtual bus to immediately switch the column bus ready signal into the second logic state, and allowing each bridge to switch the row bus ready signal into the second logic state if the ready of data transmission is completed after the bridges confirm that the column bus ready signal is switched into the second logic state; and a ninth step for allowing the source router to transmit the bus data if the row bus ready signal is switched into the second logic state through said eighth step at all the bridges.

9. The data communication method according to claim 5, in the case of selecting column broadcasting communication mode among unicast communication mode, multicast communication mode, column broadcasting communication mode or broadcasting communication mode through said first process at the source router, said second to seventh processes comprising the steps of:

a first step for generating a row bus requesting signal at the source router so as to request the use of row virtual bus;

a second step for switching a bus ready signal of the row control line of the routers except for the source router situated on the same row into a first logic state while the source router tries to take the bus grant of the row virtual bus through said first step;

a third step for allowing the source router to switch a bus busy signal into the first logic state and select the column broadcasting communication mode as the transmission mode if the source router takes the bus grant of the virtual bus through said first step;

a fourth step for allowing all the routers except for the source router to proceed to the link data freezing process according to the bus busy signal switched into the first logic state in said third step;

a fifth step for setting the routers themseves on the row virtual bus to bridges and requesting the use of the column virtual bus and simultaneously allowing the other routers in the row virtual bus except for the source router and bridge to switch the row bus ready signal into the second logic state, as the source router transfers the bit vector formatted information for the router acting as the bridge of the column broadcasting communication through the row virtual bus;

a sixth step for allowing each bridge to inform all the routers in the pertinent column virtual bus of the destination through the formed column virtual bus and to switch the column bus ready signal into the second logic state after the ready to receive the bus data is completed, if the bus grant is taken after requesting the arbitration of the column virtual bus in order to connect the virtual bus from the bridge to the destination router;

a seventh step for switching the row bus ready signal into the second logic state if the ready of data transmission is completed after the bridges confirm that the column bus ready signal is switched into the second logic state; and an eighth step for allowing the source router to transmit the bus data if the row bus ready signal is switched into the second logic state through said seventh step at all the bridges.

10. The data communication method according to claim 5, in the case of electing broadcasting communication mode among unicast communication mode, multicast communication mode, column broadcasting communication mode or broadcasting communication mode through said first process at the source router, said second to seventh processes comprising the steps of:

a first step for generating a row bus requesting signal at the source router so as to request the use of row virtual bus;

a second step for switching a bus ready signal of the row control line of the routers except for the source router situated on the same row into a first logic state while the source router tries to take the bus grant of the row virtual bus through said first step;

a third step for allowing the source router to switch a bus busy signal into the first logic state and select the broadcasting communication mode as the transmission mode if the source router takes the bus grant of the virtual bus through said first step;

a fourth step for allowing all the routers except for the source router to proceed to the link data freezing process according to the bus busy signal switched into the first logic state in said third step;

a fifth step for allowing all the routers in the row virtual bus to request the arbitration of the column virtual bus as bridge since driving the broadcasting communication mode through said third step at the source router;

a sixth step for allowing each bridge to inform all the routers in the pertinent column virtual bus of the destination through the formed column virtual bus and to switch the column bus ready signal into the second logic state after the ready to receive the bus data is completed, if the bus grant is taken after requesting the arbitration of the column virtual bus in order to connect the virtual bus from the bridge to the destination router through said fifth step;

a seventh step for switching the row bus ready signal into the second logic state if the ready of data transmission is completed after the bridges confirm that the column bus ready signal is switched into the second logic state; and an eighth step for allowing the source router to transmit the bus data if the row bus ready signal is switched into the second logic state through said seventh step at all the bridges.

* * * * *